United States Patent
Yuk et al.

(10) Patent No.: US 10,559,844 B2
(45) Date of Patent: Feb. 11, 2020

(54) CLAMPING APPARATUS OF BATTERY CELL COMPRISING FIXING JIG EMPLOYED WITH GUIDE BLOCK FOR ALIGNMENT OF BATTERY CELL

(71) Applicant: LG Chem, Ltd., Seoul (KR)

(72) Inventors: Keun Ho Yuk, Daejeon (KR); Hyun Park, Daejeon (KR); Chan Ki Park, Daejeon (KR); Jae Han Jung, Daejeon (KR)

(73) Assignee: LG Chem, Ltd., Seoul (KR)

( * ) Notice: Subject to any disclaimer, the term of this patent is extended or adjusted under 35 U.S.C. 154(b) by 99 days.

(21) Appl. No.: 15/873,592

(22) Filed: Jan. 17, 2018

(65) Prior Publication Data

US 2018/0205110 A1    Jul. 19, 2018

(30) Foreign Application Priority Data

Jan. 19, 2017    (KR) .................. 10-2017-0009023

(51) Int. Cl.
*H01M 10/04* (2006.01)
*H01M 10/06* (2006.01)
(Continued)

(52) U.S. Cl.
CPC ....... *H01M 10/0481* (2013.01); *H01M 6/005* (2013.01); *H01M 10/0436* (2013.01);
(Continued)

(58) Field of Classification Search
CPC ......... H01M 10/0481; H01M 10/0436; H01M 10/0404; H01M 10/058; H01M 10/04; H01M 10/049; H01M 2220/30; H01M 6/005; H01M 4/043; H01M 4/0433; H01M 4/0471; H01M 2/1061
See application file for complete search history.

(56) References Cited

U.S. PATENT DOCUMENTS

2010/0244342 A1\* 9/2010 Zander .................. B23B 47/287
269/1
2015/0104686 A1\* 4/2015 Brommer ............ H01M 2/1077
429/99

FOREIGN PATENT DOCUMENTS

JP  2003-346885 A   12/2003
JP  2011-070975 A   4/2011
(Continued)

*Primary Examiner* — Ula C Ruddock
*Assistant Examiner* — Matthew W Van Oudenaren
(74) *Attorney, Agent, or Firm* — Mintz Levin Cohn Ferris Glovsky and Popeo, P.C.; Steven M. Jensen

(57) ABSTRACT

The present disclosure provides a battery cell clamping device to fix and clamp two or more battery cells in a process of clamping and baking the battery cells arranged in one direction, including fixing jigs interposed between the battery cells, a pressure applying part configured to clamp a cell arrangement by applying a pressure with the fixing jigs interposed, and a base having a structure supporting the cell arrangement in a direction against the pressure applied from the pressure applying part in a state in which the cell arrangement is disposed on an upper surface of the base, wherein each of the fixing jigs is formed with guide blocks to align the battery cell at a fixed position on the jig in such a manner that the guide block abuts at least two side surfaces of the battery cell which are extended with respect to each other.

13 Claims, 5 Drawing Sheets

(51) Int. Cl.
*H01M 6/00* (2006.01)
*H01M 4/04* (2006.01)
*H01M 2/10* (2006.01)

(52) U.S. Cl.
CPC .......... *H01M 2/1061* (2013.01); *H01M 4/043* (2013.01); *H01M 4/0471* (2013.01); *H01M 10/0404* (2013.01); *H01M 2220/30* (2013.01)

(56) References Cited

FOREIGN PATENT DOCUMENTS

KR  10-2015-0037049 A    4/2015
KR     1020150037049  *  4/2015

* cited by examiner

CLAMPING APPARATUS OF BATTERY CELL COMPRISING FIXING JIG EMPLOYED WITH GUIDE BLOCK FOR ALIGNMENT OF BATTERY CELL

CROSS-REFERENCE TO RELATED APPLICATION

This application claims priority to Korean Patent Application No. 10-2017-0009023 filed on Jan. 19, 2017, the contents of which are incorporated by reference in their entirety.

TECHNICAL FIELD

The present disclosure relates to a clamping apparatus of a battery cell including a fixing jig employed with a guide block for alignment of a battery cell.

RELATED ART

Depletion of fossil fuel has brought about a great increase in the price of energy sources and increased interest in environmental pollution. Eco-friendly alternative energy sources are a necessity for the next generation. In this regard, a great deal of research into power production methods such methods of producing as nuclear energy, solar power, wind power, and tidal power is underway, and a power storage device for efficiently utilizing the produced energy is also attracting much attention.

Particularly, as mobile devices have been increasingly developed and the demand for such mobile devices has increased, the demand for secondary batteries has also sharply increased as an energy source for the mobile devices. Accordingly, much research into batteries satisfying various needs has been carried out.

In terms of the shape of batteries, the demand for prismatic secondary batteries or pouch-shaped secondary batteries which are thin enough to be applied to products such as mobile phones is very high. In terms of the material for batteries, the demand for lithium secondary batteries, such as lithium ion batteries and lithium ion polymer batteries, exhibiting high energy density, discharge voltage, and output stability is very high.

In particular, a pouch-shaped battery having a structure in which a stacked or stacked/folded type electrode assembly is embedded in a pouch-shaped battery case of an aluminum laminate sheet has recently attracted much attention due to its low manufacturing cost, light weight, ease of shape customization, and the like, and its usage is gradually increasing.

Generally, such a pouch-shaped battery cell is manufactured through various processes such as a process of preparing a primary battery cell having a structure in which an electrode assembly and an electrolyte are housed together in a battery case, a process of aging the primary battery cell, an activation process of charging/discharging the primary battery cell, and a degassing process of removing gases generated during the aging process and the charging/discharging process.

Here, the primary battery cell is subjected to a clamping-baking process of applying a predetermined temperature and pressure to adjust a thickness of the primary battery cell in the activation process of charging/discharging the primary battery cell.

FIG. 1 is a schematic view schematically showing a structure of a battery cell clamping device configured to fix and clamp a battery cell in a conventional clamping-baking process.

Referring to FIG. 1, a battery cell clamping device 100 includes battery cell fixing jigs 120, a pressure applying part 140, and a base 150.

The battery cell fixing jig 120 is a flat plate-shaped member and is interposed between a plurality of battery cells 110.

The pressure applying part 140 has a structure to fix and clamp a battery cell arrangement 130 by applying a pressure from one surface of the battery cell arrangement 130 arranged in a state in which each of the battery cell fixing jigs 120 is interposed between the battery cells 110 to a direction of the other surface opposite to the one surface.

The base 150 includes a base plate 151 and a supporting outer wall 152.

The battery cell arrangement 130 is disposed on an upper surface of the base plate 151.

The supporting outer wall 152 has a flat plate-shaped structure vertically protruding in a direction of the upper surface of the base plate 151 at one side end part of the base plate 151 to support the battery cell arrangement 130 against the pressure applied from the pressure applying part 140.

Here, since the pressure applied to each of the battery cells 110 may be different according to a position of each of the battery cells 110, a thickness of each of the battery cells 110 may be different after the clamping-baking process of the battery cells 110.

Accordingly, various conditions such as a pressure applied from the pressure applying part 140 and a distance between the battery cell fixing jigs 120 need to be adjusted to apply a uniform pressure to all of the battery cells 110 in a process of clamping the battery cells 110.

However, a process of setting and adjusting such various and complicated conditions during the process of clamping the battery cells 110 may serve as a factor for increasing manpower and a time required for the process of clamping the battery cells 110.

Further, since the pressures applied to the battery cells 110 need to be separately measured during the process, a separate pressure measuring device configured to measure and display the pressure is necessarily required. Thus the number of devices required for the process of clamping the battery cells 110 is increased, a configuration thereof becomes complicated, and a cost of the above-mentioned device is increased, and thus a problem of increased cost for manufacturing the battery cells 110.

Therefore, there is a great need for a technology that can fundamentally solve such problems.

SUMMARY

The present disclosure is provided to solve the above-described problems of the related art and technical problems which have been identified in the past.

Specifically, the present disclosure provides a battery cell clamping device capable of uniformly distributing a pressure applied by a pressure applying part to front surfaces of battery cells mounted on fixing jigs in a state in which the battery cells are aligned at fixed positions by using guide blocks which are used to position the battery cells at fixed positions on the fixing jigs.

In order to accomplish the above object, according to the present disclosure, a battery cell clamping device may be a device configured to fix and clamp two or more battery cells in a process of clamping and baking the battery cells arranged in one direction, and the battery cell clamping device includes fixing jigs interposed between the battery cells, a pressure applying part configured to clamp a cell arrangement by applying a pressure from one surface toward a direction of the other surface opposite to the one surface of the cell arrangement arranged with the fixing jigs interposed, and a base having a structure supporting the cell arrangement in a direction against the pressure applied from the pressure applying part in a state in which the cell arrangement is disposed on an upper surface of the base.

Here, each of the fixing jigs is formed with guide blocks to align the battery cell at a fixed position on the jig in such a manner that the guide block abuts at least two side surfaces of the battery cell which are extended with respect to each other.

The clamping device having such a structure may largely provide following advantages.

First, the pressure applied by the pressure applying part may be uniformly distributed to front surfaces of the battery cells mounted on the fixing jigs in a state in which the battery cells are aligned at the fixed positions by the guide blocks.

For example the pressure from the pressure applying part may be applied in an order of a first battery cell, a fixing jig, a second battery cell, and another fixing jig for the case of the cell arrangement in the order of the first battery cell, the fixing jig, the second battery cell, and another fixing jig if the first battery cell and the second battery cell are mounted on the fixing jigs without being aligned. However, if the first battery cell and the second battery cell which are not aligned with each other are mounted on the fixing jigs without completely overlapping each other, pressures applied to a non-overlapped portion and an overlapped portion of the first and second battery cells may be different.

In consideration of this, in the present disclosure, the battery cell is mounted on the fixing jig in an aligned state by the guide blocks and the remaining battery cells may also be mounted in aligned states on the fixing jigs so that all of the battery cells in the cell arrangement may be positioned to vertically overlap each other, and thus the pressure may be uniformly distributed on the front surface of each of the battery cells.

Each portion of the battery cell pressurized may be compressed to a uniform thickness, and this may be the same for the remaining battery cells.

This may solve the above-described conventional problem of non-uniform thicknesses of the battery cells due to non-uniform pressures applied to the battery cells.

Second, the battery cell clamping device according to the present disclosure does not require that the pressures applied to the battery cells are individually measured due to the above advantage, and accordingly, it is possible to reduce a cost for a separate measuring device configured to measure the pressure, and to construct a battery cell clamping device with a more simplified structure, and thus an overall cost and time for manufacturing the battery cells may be saved.

Hereinafter, a structure of the fixing jig and guide block will be described in detail using non-limiting examples.

In one specific example, each of the fixing jigs may include a rectangular plate-shaped plate on which the battery cell is seated; and the guide block protrudes in a vertical direction from one surface of the plate on which the battery cell is seated.

In the present disclosure, the guide block may be mounted on the plate in a detachable manner by mechanical fastening.

The mechanical fastening may be fastening using screws and bolts, and thus the guide block and the plate may be formed with screw grooves that correspond with each other.

In particular, a plurality of screw grooves may be formed in the plate to enable a coupling position of the guide block to be adjusted based on a size of a battery cell.

Alternatively, the guide block may be formed integrally with the plate.

The guide block may have an L-bracket-shape on a plane to abut two side surfaces of the battery cell which form any corner thereof.

The guide block may also include a first block and a second block, and each of the first block and the second block is located on each of divided sides when a plane of the plate-shaped plate is symmetrically partitioned by a diagonal line, and the first block and the second block may be disposed at different corners of the battery cell with respect to the diagonal line.

That is, the first and second blocks may restrict upward, downward, rightward, and leftward movements of the battery cell by fixing corners of the battery cell which are symmetrical with respect to the diagonal line rather than corners of the battery cell which are positioned parallel to each other.

Here, the term "upward" refers to a direction of an upper end portion of the battery cell on which electrode terminals are formed, the term "downward" refers to a direction opposite to the "upward" direction, and the terms "rightward" and "leftward" are directions based on the electrode terminals.

In the present disclosure, a protruding height of the guide block may be less than a thickness of the battery cell to compress the battery cell, and specifically, may be 10% to 50% relative to the thickness of the battery cell.

More specifically, the cell arrangement may have a structure in which the battery cells are adjacently arranged in a state in which the battery cells are mounted on the fixing jigs while being aligned by the guide blocks.

The cell arrangement may be clamped in a fixed state so that a distance between adjacent fixing jigs with one battery cell therebetween is equal to a difference between a thickness of the battery cell and a height of the guide block which abuts the battery cell.

That is, the protruding height of the guide block may be understood to be a maximum thickness to which the battery cell may be clamped.

Accordingly, when the protruding height of the guide block is less than a minimum value of such a range, it is difficult to attain a desired effect because the fixing is ineffective and the clampable thickness is increased, and thus an excessive pressure may be applied to the battery cell, which is not preferable. In other words, the guide block supports an adjacent fixing block when the battery cell is fully compressed in the clamping process, thereby preventing the battery cell from being clamped beyond a desired pressure.

On the other hand, when the protruding height of the guide block exceeds the maximum value of the above range, the clampable thickness of the battery cell is reduced such that a practical purpose of the clamping device is difficult to achieve, which is not preferable.

The number of battery cells in the cell arrangement may be equal to the number of fixing jigs.

As described above, the cell arrangement may be formed by interposing the fixing jigs between the battery cells.

Accordingly, the number of the fixing jigs may be configured to be equal to the number of the battery cells, and thus all of the battery cells may be arranged in a state of being mounted on the fixing jigs to form a cell arrangement.

Further, the base may include: a base plate on which the battery cell arrangement is disposed; and a supporting outer wall vertically protruding from an upper surface of the base plate to support the battery cell arrangement against the pressure applied from the pressure applying part.

The base has an L-shaped structure including a base plate having a flat plate-shaped structure and the supporting outer wall, and may more stably support the battery cell arrangement against the pressure applied from the pressure applying part.

The present disclosure also provides a method of clamping battery cells using the battery cell clamping device, the method including:

a) a process of forming a cell arrangement by arranging two or more battery cells in one direction in a state in which the two or more battery cells are mounted on fixing jigs to fix each of the battery cells to guide blocks;

b) a process of placing the cell arrangement on an upper surface of a base plate of a base so that one surface of the cell arrangement corresponding to an arrangement direction faces a supporting outer wall of the base; and c) a process of fixing and clamping the battery cells by applying a pressure from a direction opposite to the supporting outer wall on the other surface of the cell arrangement through a pressure applying part.

Here, the cell arrangement in process c) may be clamped in a fixed state so that a distance between adjacent fixing jigs with one battery cell therebetween is equal to a difference between a thickness of the battery cell and a height of the guide block which abuts the battery cell.

Accordingly, the battery cells can be more easily clamped by simply adjusting only the distance between the battery cell fixing jigs, which can be visually recognized during the process of clamping the battery cells, and therefore when compared to the related art in which various complex factors must be adjusted to measure all pressures applied to each of the battery cells and maintain the pressures to be uniform.

The present disclosure further provides a battery cell manufacturing apparatus including the battery cell clamping device, and the remaining configuration of the battery cell manufacturing apparatus is well known in the art so that a detailed description thereof will be omitted in this specification.

As described above, in the battery cell clamping device according to the present disclosure, first, the pressure applied by the pressure applying part may be uniformly distributed to the front surfaces of the battery cells mounted on the fixing jigs in a state in which the battery cells are aligned at the fixed positions by the guide blocks, and the battery cell clamping device according to the present disclosure does not need to individually measure the pressures applied to the battery cells due to the above advantage, and accordingly, it is possible to reduce a cost for a separate measuring device configured to measure the pressure and to construct the battery cell clamping device with a more simplified structure, and thus an overall cost and time for manufacturing the battery cells may be saved.

BRIEF DESCRIPTION OF THE DRAWINGS

The following drawings accompanying the specification illustrate exemplary embodiments of the present disclosure, and serve to enable technical concepts of the present disclosure to be further understood together with a detailed description of the disclosure given below, and therefore the present disclosure is not to be interpreted only with matters in such drawings.

DETAILED DESCRIPTION

Hereinafter, exemplary embodiments of the disclosure will be described in more detail with reference to the drawings, and the scope of the present disclosure is not limited thereto.

Figure 1:
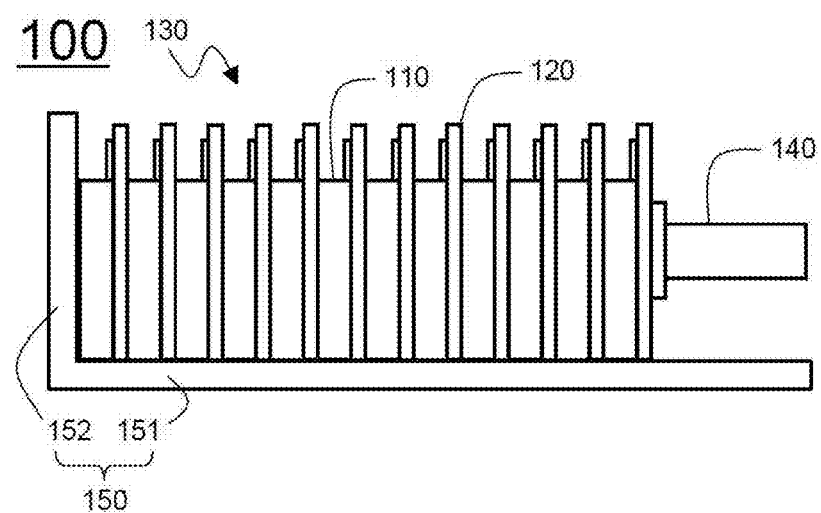
FIG. 1 is a schematic view of a clamping device according to the related art.
Figure 2:
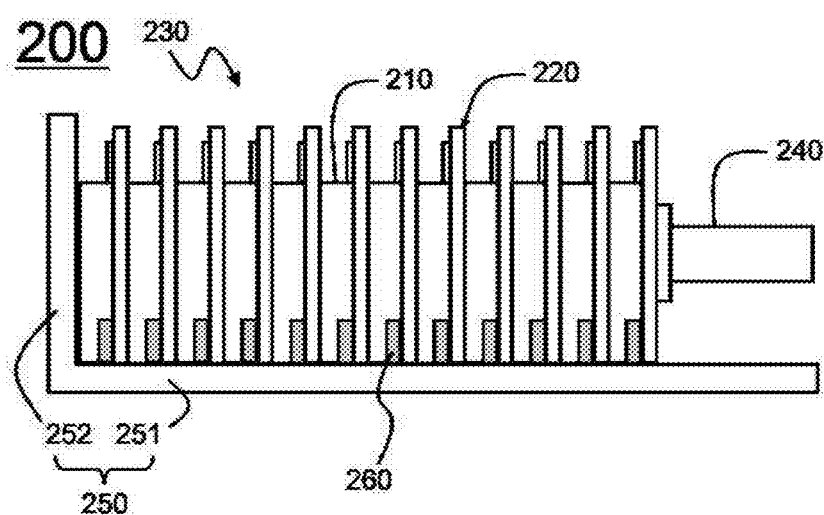
FIG. 2 is a schematic view of a battery cell clamping device according to one exemplary embodiment of the present disclosure.

FIG. 2 is a schematic view schematically showing a structure of a battery cell clamping device according to one exemplary embodiment of the present disclosure.

A battery cell clamping device 200 includes fixing jigs 220 interposed between battery cells 210, a pressure applying part 240 configured to clamp a cell arrangement 230 by applying a pressure from one surface of the cell arrangement 230 toward a direction of the other surface opposite to the one surface which is arranged with the fixing jigs 220 interposed, and a base 250 having a structure configured to support the cell arrangement 230 in a direction against the pressure applied from the pressure applying part 240 in a state in which the cell arrangement 230 is disposed on an upper surface of the base 250.

The base 250 includes a base plate 251 and a supporting outer wall 252.

The battery cell arrangement 230 is disposed on an upper surface of the base plate 251.

The supporting outer wall 252 has a flat plate-shaped structure protruding vertically in a direction of the upper surface of the base plate 251 at one side end part of the base plate 251 to support the battery cell arrangement 230 against the pressure applied from the pressure applying part 240 in a state facing the battery cell 210 positioned at an outermost position of the cell arrangement 230.

The fixing jig 220 includes guide blocks 260 which align the battery cell 210 at a fixed position on the jig.

Figure 3:
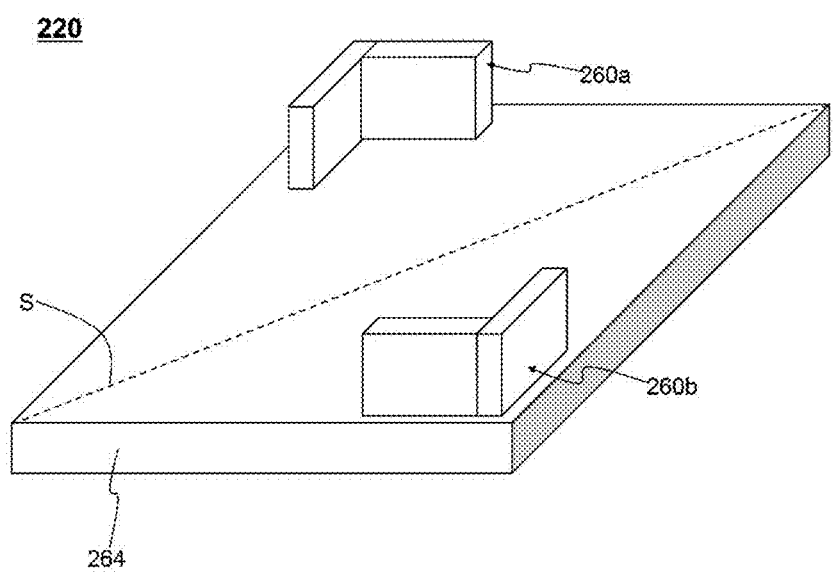
FIGS. 3 and 4 are exemplary schematic views of a fixing jig.
Figure 4:
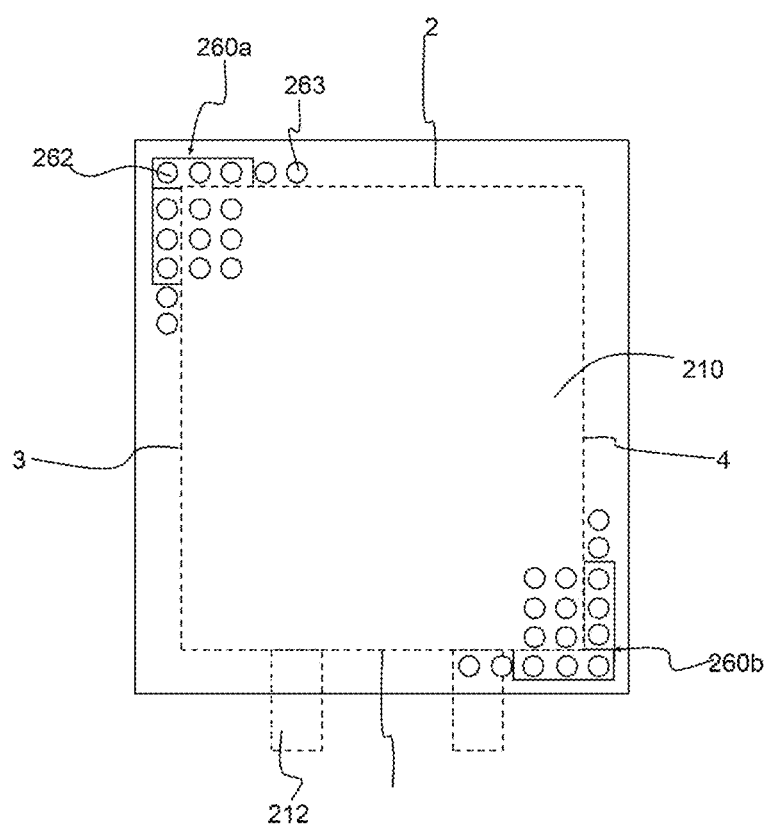

In relation to this, FIGS. 3 and 4 are exemplary schematic views of the fixing jig.

Referring to FIGS. 3 and 4, each of the fixing jigs 220 may include a rectangular plate-shaped plate 264 on which the battery cell 210 is seated, and the guide block 260 protrudes in a vertical direction from one surface of the plate 264 on which the battery cell 210 is seated.

The guide block 260 also includes a first block 260a and a second block 260b, each of which is located on each of divided sides when the plane of the plate-shaped plate 264 is symmetrically partitioned by an imaginary diagonal line S.

The first block 260a and the second block 260b may have an L-bracket-shape on the plane to abut two side surfaces of the battery cell 210 which form any corner thereof, and may be located at different corners of the battery cell 210 with respect to the diagonal line S.

Accordingly, the first block 260a and the second block 260b may restrict upward 1, downward 2, rightward 3, and leftward 4 movements of the battery cell by fixing corners of the battery cell 210 which are symmetrical with respect to the diagonal line rather than corners of the battery cell 210 which are positioned parallel to each other.

The first block 260a and the second block 260b protrude in the vertical direction from the one surface of the plate 264 on which the battery cell 210 is seated.

Here, the first block 260a and the second block 260b are detachably mounted on the plate 264 by screws (not shown) or bolts (not shown), and the guide block 260 and the plate are formed with screw grooves 262 that correspond with each other.

In particular, a plurality of spare screw grooves 263 are formed in the plate so that a coupling position of the guide block 260 is adjustable based on a size of the battery cell.

Accordingly, the fixing jig 220 according to the present disclosure is configured to fix battery cells of various sizes by varying coupling positions of the first block 260a and the second block 260b based on the size of the battery cell 210.

Figure 5:
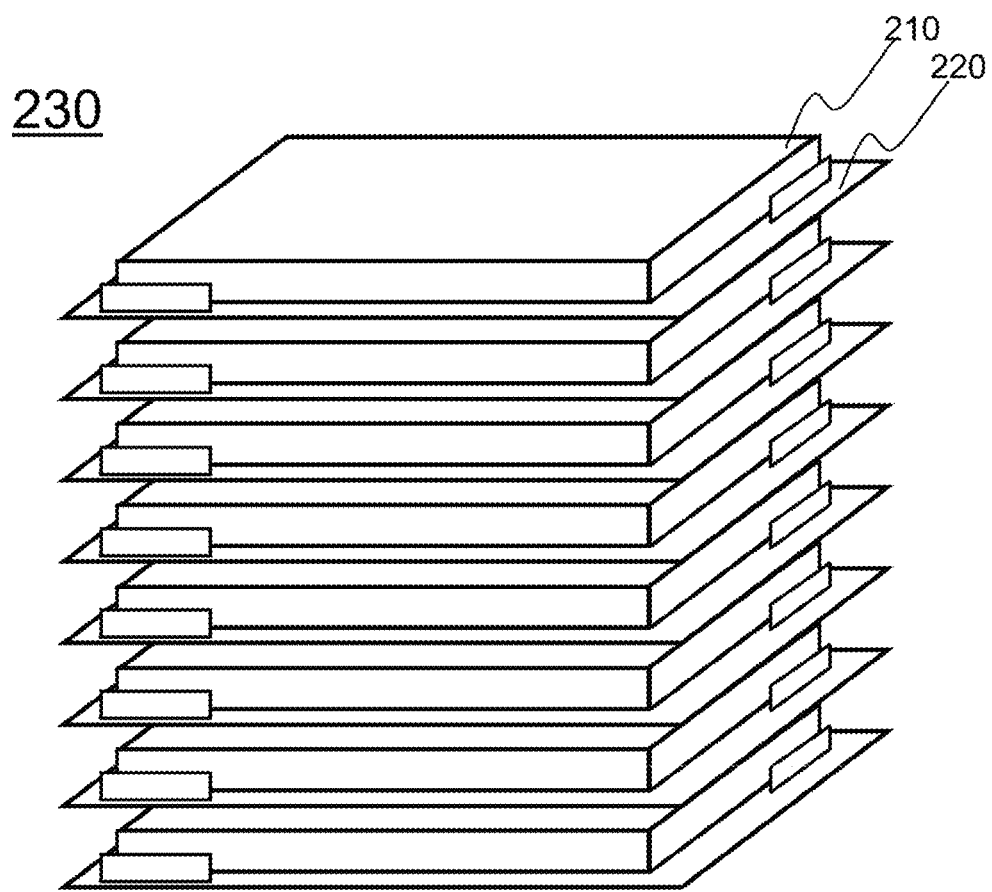
FIG. 5 is an exemplary schematic view of a cell arrangement according to the present disclosure.

FIG. 5 is an exemplary schematic view of a cell arrangement 230 according to the present disclosure.

Referring to FIG. 5, the number of battery cells 210 in the cell arrangement 230 is equal to the number of fixing jigs 220. The cell arrangement 230 is formed by interposing the battery cell fixing jigs 220 between the battery cells 210, and a thickness of the battery cell may be compressed as the battery cell is pressed by an adjacent fixing jig in a clamping process.

It should be understood by those skilled in the art that various changes may be made without departing from the spirit and scope of the present disclosure.

The invention claimed is:

1. A battery cell clamping device configured to fix and clamp two or more battery cells in a process of clamping and baking the battery cells arranged in one direction, comprising:
   fixing jigs interposed between the battery cells;
   a pressure applying part configured to clamp a cell arrangement, which is arranged with the fixing jigs interposed, by applying a pressure from one surface of the cell arrangement toward a direction of the other surface opposite to the one surface; and
   a base having a structure supporting the cell arrangement in a direction against the pressure applied from the pressure applying part in a state in which the cell arrangement is disposed on an upper surface of the base,
   wherein each of the fixing jigs is formed with guide blocks to align a given battery cell at a fixed position on the each of the fixing jigs in such a manner that each guide block abuts at least two side surfaces of the given battery cell which are extended with respect to each other,
   wherein the each of the fixing jigs includes a rectangular plate on which the given battery cell is seated, and the each guide block protrudes in a vertical direction from one surface of the rectangular plate on which the given battery cell is seated, and
   wherein a protruding height of the each guide block is less than a thickness of the given battery cell to allow the pressure applying part to apply the pressure to the battery cells when clamped.

2. The battery cell clamping device of claim 1, wherein the each guide block is detachably mounted on the rectangular plate by mechanical fastening.

3. The battery cell clamping device of claim 1, wherein the each guide block is formed integrally with the rectangular plate.

4. The battery cell clamping device of claim 1, wherein the each guide block has an L-bracket-shape on a plane to abut two side surfaces of the given battery cell which form any corner thereof.

5. The battery cell clamping device of claim 1, wherein the each guide block comprises a first block and a second block, each of which is located on both of partitioned sides when a plane of the rectangular plate is symmetrically partitioned by a diagonal line; and
   the first block and the second block are disposed at different corners of the given battery cell with respect to the diagonal line.

6. The battery cell clamping device of claim 1, wherein the protruding height of the each guide block is 10% to 50% of the thickness of the given battery cell.

7. The battery cell clamping device of claim 1, wherein the cell arrangement is clamped in a fixed state so that a distance between adjacent fixing jigs with one battery cell therebetween is equal to a difference between a thickness of the one battery cell and a height of the each guide block which seats the one battery cell.

8. The battery cell clamping device of claim 1, wherein the pressure applied by the pressure applying part is uniformly distributed to front surfaces of the battery cells mounted on the fixing jigs in a state in which the battery cells are aligned at the fixed positions by the guide blocks.

9. The battery cell clamping device of claim 1, wherein the number of battery cells in the cell arrangement is equal to the number of fixing jigs.

10. The battery cell clamping device of claim 1, wherein the base comprises:
    a base plate on which the cell arrangement is disposed; and
    a supporting outer wall vertically protruding from an upper surface of the base plate to support the battery cell arrangement against the pressure applied from the pressure applying part.

11. A method of clamping battery cells using the battery cell clamping device of claim 1, comprising:
    a) a process of forming the cell arrangement by arranging two or more battery cells in one direction in a state in which the two or more battery cells are mounted on the fixing jigs to fix each of the battery cells to the guide blocks;
    b) a process of placing the cell arrangement on the upper surface of a base plate of the base so that one surface of the cell arrangement corresponding to an arrangement direction faces a supporting outer wall of the base; and
    c) a process of fixing and clamping the battery cells by applying the pressure from a direction opposite to the supporting outer wall on the other surface of the cell arrangement through the pressure applying part.

12. The method of claim 11, wherein the cell arrangement in process c) is clamped in a fixed state so that a distance between adjacent fixing jigs with one battery cell therebetween is equal to a difference between a thickness of the one battery cell and a height of the each guide block which seats the one battery cell.

13. The battery cell clamping device of claim 2, wherein the each guide block includes at least one screw groove, and
    wherein the rectangular plate includes a plurality of screw grooves corresponding to the at least one screw groove of the each guide block to allow a mounting position of the each guide block to be adjustable on the one surface of the rectangular plate on which the given battery cell is seated.

\* \* \* \* \*